US012115397B1

(12) United States Patent
Patel

(10) Patent No.: US 12,115,397 B1
(45) Date of Patent: Oct. 15, 2024

(54) DEPLOYABLE FIRE SUPPRESSIVE DEVICE

(71) Applicant: Kiran Kumar Patel, Fort MacLeon (CA)

(72) Inventor: Kiran Kumar Patel, Fort MacLeon (CA)

( * ) Notice: Subject to any disclaimer, the term of this patent is extended or adjusted under 35 U.S.C. 154(b) by 0 days.

(21) Appl. No.: 18/516,411

(22) Filed: Nov. 21, 2023

(51) Int. Cl.
*A62C 2/04* (2006.01)

(52) U.S. Cl.
CPC ..................................... *A62C 2/04* (2013.01)

(58) Field of Classification Search
CPC .. A62C 2/06; A62C 2/04; A62C 3/006; A62C 3/06–065; A62C 8/00; E21B 33/02; E21B 33/068; F23Q 25/00
See application file for complete search history.

(56) References Cited

U.S. PATENT DOCUMENTS 1,941,072 A * 12/1933 Benziger ................ F23Q 25/00 431/145
5,423,150 A 6/1995 Hitchcock
5,829,200 A 11/1998 Jones et al.
5,860,251 A 1/1999 Gleich
6,305,928 B1 * 10/2001 Novak .................. F23Q 25/00 D29/127
6,810,626 B2 11/2004 Meyer et al.
10,213,634 B1 2/2019 Maldonado
11,395,932 B1 7/2022 Johnson
2009/0139736 A1 * 6/2009 Medina .................. A62C 2/06 169/54
2013/0061544 A1 3/2013 Stahl et al.
2014/0360738 A1 12/2014 Tien
2018/0132472 A1 * 5/2018 George ............... A01M 21/043
2020/0384294 A1 12/2020 Zhou et al.
2021/0353983 A1 * 11/2021 Karagatzides ........... A62C 2/04

FOREIGN PATENT DOCUMENTS

DE 2650274 A1 5/1978

* cited by examiner

*Primary Examiner* — Tuongminh N Pham
(74) *Attorney, Agent, or Firm* — Gugliotta & Gugliotta, LPA

(57) ABSTRACT

The present invention relates to a deployable fire suppressive device designed for efficiently extinguishing fires, particularly suitable for campfires and kitchen stove fires. This innovative device features an extendable handle, transitioning from three feet in a collapsed state to six feet when extended, ensuring user safety from heat and flames. The core component is a fire-resistant fabric, arranged in a tubular formation, supported by a collapsible spring steel frame reminiscent of an oversized "Slinky." This design enables quick deployment and effective coverage of the fire, robbing it of oxygen to extinguish it swiftly. The tubular fabric can be adapted to various shapes, including a square configuration, enhancing its versatility across different fire scenarios. The device is designed for user-friendly operation, easy storage, and reusability, making it a practical solution for quick fire suppression. Its safety-focused design and simple oxygen deprivation mechanism offer a significant advancement in the field of fire safety equipment.

14 Claims, 5 Drawing Sheets

DEPLOYABLE FIRE SUPPRESSIVE DEVICE

RELATED APPLICATIONS

There are no previously filed, nor currently any co-pending applications, anywhere in the world. Additional applications of related continuity are further disclosed as part of the Application Data Sheet filed pursuant to 37 C.F.R. § 1.76. All Related Applications are incorporated by reference as if fully rewritten herein.

BACKGROUND OF THE INVENTION

1. Field of the Invention

The present invention relates to fire suppression equipment, particularly suited for extinguishing fires such as campfires or kitchen stove fires.

2. Description of the Related Art

Using a fire suppressant blanket to put out a stove fire or camp fire can present several difficulties and challenges. Firstly, the urgency and high temperature of the fire can make it a challenge to safely and quickly deploy the blanket. The intense heat and flames require swift and precise action, but handling the blanket without proper protection can lead to burns or injuries. Additionally, the size, shape, and positioning of the fire, may make it difficult to effectively cover the flames with the blanket. Ensuring complete coverage is crucial to smothering the fire and preventing oxygen from reigniting it. Moreover, the heat and smoke generated by the fire can impair visibility, making it harder to position the blanket accurately.

Accordingly, there exists a need for a means by which in the midst of the chaotic situation of a stove or camp fire, that a fire suppressant blanket is exactly positioned to avoid exacerbating the fire or causing personal injury.

SUMMARY OF THE INVENTION

It is thus objects of the present invention to provide system for and method of extinguishing a fire and, more particularly, to a fire extinguishing device for camp fires or stove fires.

It is a feature of the present invention to deploy a fire-resistant fabric in a tubular format, supported by a collapsible spring steel frame, for extinguishing fires by depriving them of oxygen Briefly described according to a preferred embodiment, the present invention discloses a deployable fire suppressive device designed to quickly and effectively extinguish fires by depriving them of oxygen. The device comprises an extendable handle, a collapsible frame system, and a fire-resistant fabric arranged in a tubular format. A handle, approximately three feet in length when collapsed, can extend to six feet, ensuring the user stays at a safe distance from heat and flames. This telescopic handle is collapsible for compact storage when not in use. A fire suppressant blanket in thereby deployed a tubular format. The sides of the tube are supported by a collapsing spring steel frame, akin to an oversized "Slinky," allowing for easy deployment and retraction of the fabric.

The frame system can be configured in different shapes, including a square version, to accommodate various fire types and sizes. The top of the tube is closed with a fire suppressant textile, ensuring complete encapsulation of the fire. Such a design keeps the user away from the flames and heat, minimizing the risk of burns and injuries. It operates by simply robbing the fire of oxygen and does not rely on hazardous or messy extinguishing agents.

Additionally, a swivel bracket at the center of the frame allows for improved maneuverability. Additionally, a misting wand attachment is provided for dousing fires with water, if necessary.

It is an advantage of the device that it is specifically designed for extinguishing campfires or kitchen stove fires, offering effective fire control in common and potentially hazardous scenarios.

It is another advantage that the device's design prioritizes safety. With its extended handle and fire extinguishing blanket, the user is kept at a safe distance from flames and heat, significantly reducing the risk of burns and injuries.

It is an advantage that the device operates by depriving the fire of oxygen, a fundamental and effective principle in fire suppression. This simple mechanism avoids the need for hazardous or messy extinguishing agents.

It is another advantage that the device features an innovative fire suppressant textile. The blanket is arranged in a tubular format with sides supported by a collapsible spring steel frame, similar to an oversized "Slinky," ensuring comprehensive fire coverage.

It is an advantage that the device is versatile in its design, including a square version of the textile tube, which enhances its effectiveness on different fire shapes and sizes.

It is another advantage that the device has a conveniently designed handle. The telescopic handle is approximately three feet long when collapsed and extends to six feet, enabling compact storage and safe, extended reach during use.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | deployable fire suppressive device |
| 15 | user |
| 20 | hand |
| 25 | extended handle |
| 30 | handle segment |
| 35 | swivel joint |
| 40 | frame system |
| 45 | fire-resistant fabric |
| 50 | deployment travel path "d" |
| 55 | fire suppressive substance |
| 60 | fire |
| 65 | collapsed handle |
| 70 | hanging loop |
| 75 | release button |
| 80 | actuating pin |
| 85 | return spring |
| 90 | actuating travel path "a" |
| 95 | release cable |
| 100 | actuating mechanism |
| 105 | release mechanism |
| 110 | water |
| 120 | wand |
| 125 | plunger |
| 130 | nozzle |
| 135 | strap |

DESCRIPTION OF THE PREFERRED EMBODIMENTS

Figure 4:
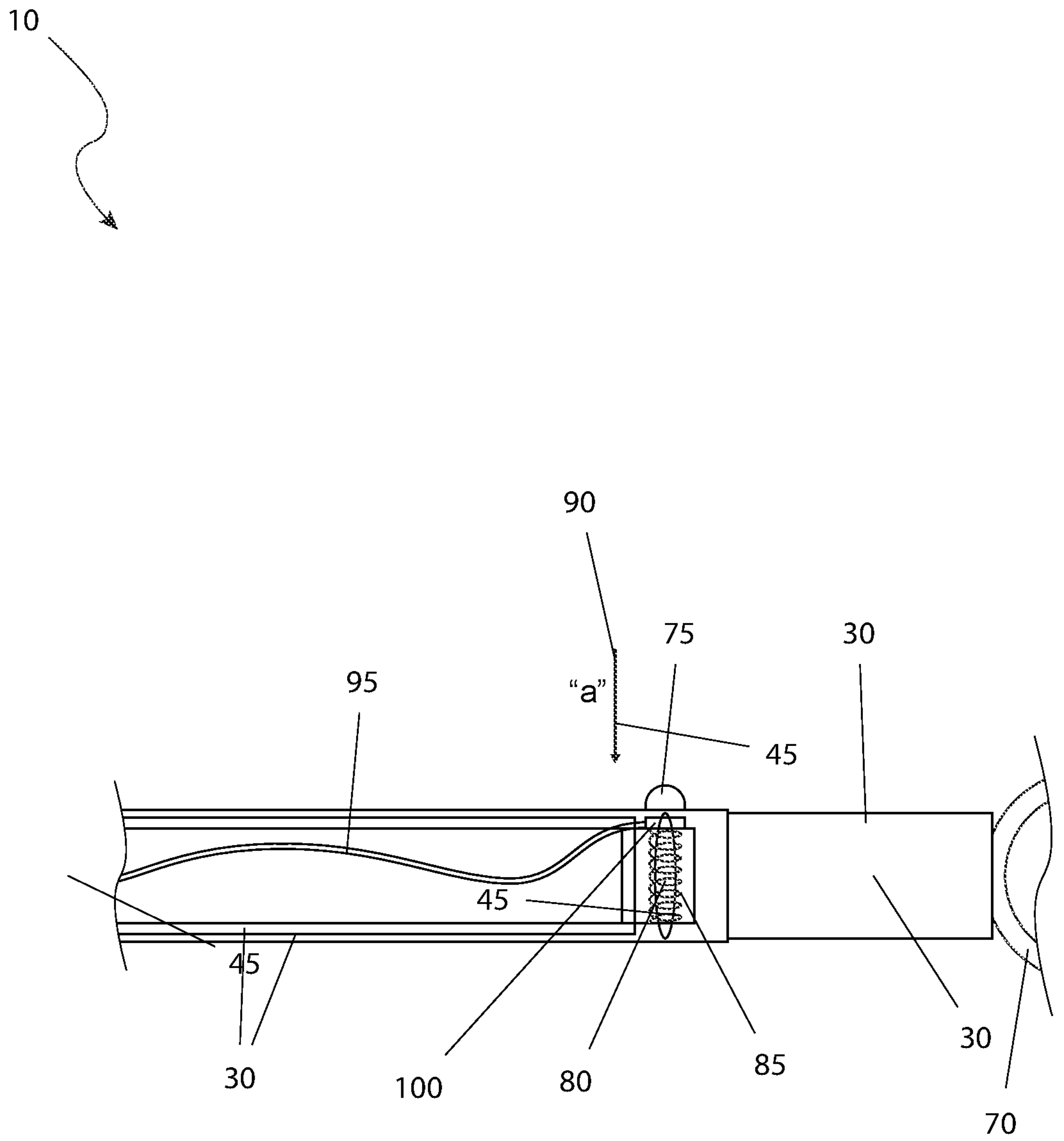
FIG. 4 is a sectional view of the deployable fire suppressive device 10, as seen along a line I-I, as shown in FIGS. 2 and 3, according to the preferred embodiment of the present invention.
Figure 5:
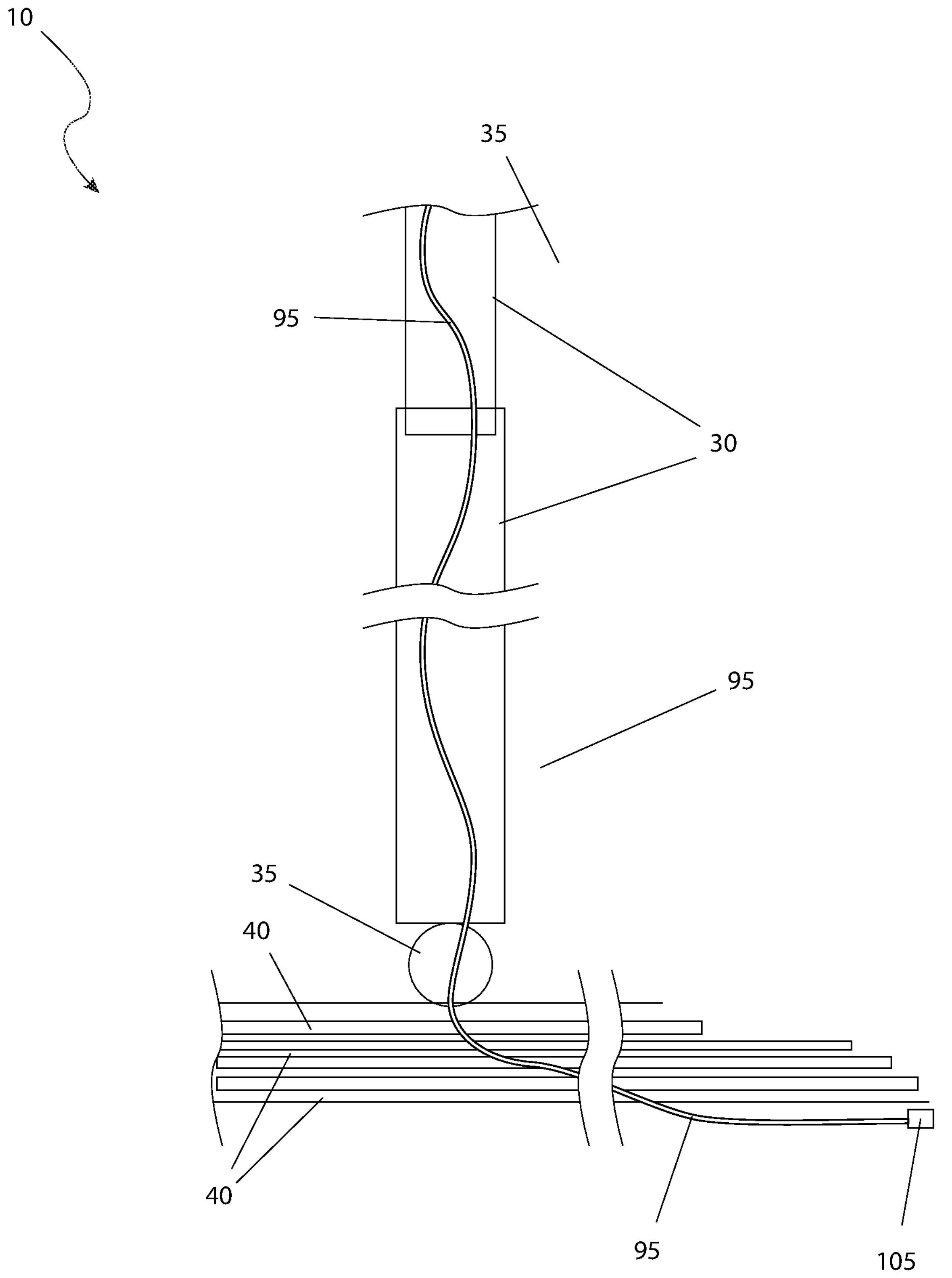
FIG. 5 is a sectional view of the deployable fire suppressive device 10, as seen along a line II-II, as shown in FIGS. 2 and 3, according to the preferred embodiment of the present invention; and, FIG. 6 is an environmental view of the deployable fire suppressive device 10 with an optional misting wand 120 attached thereto, according to the preferred embodiment of the present invention.
Figure 6:
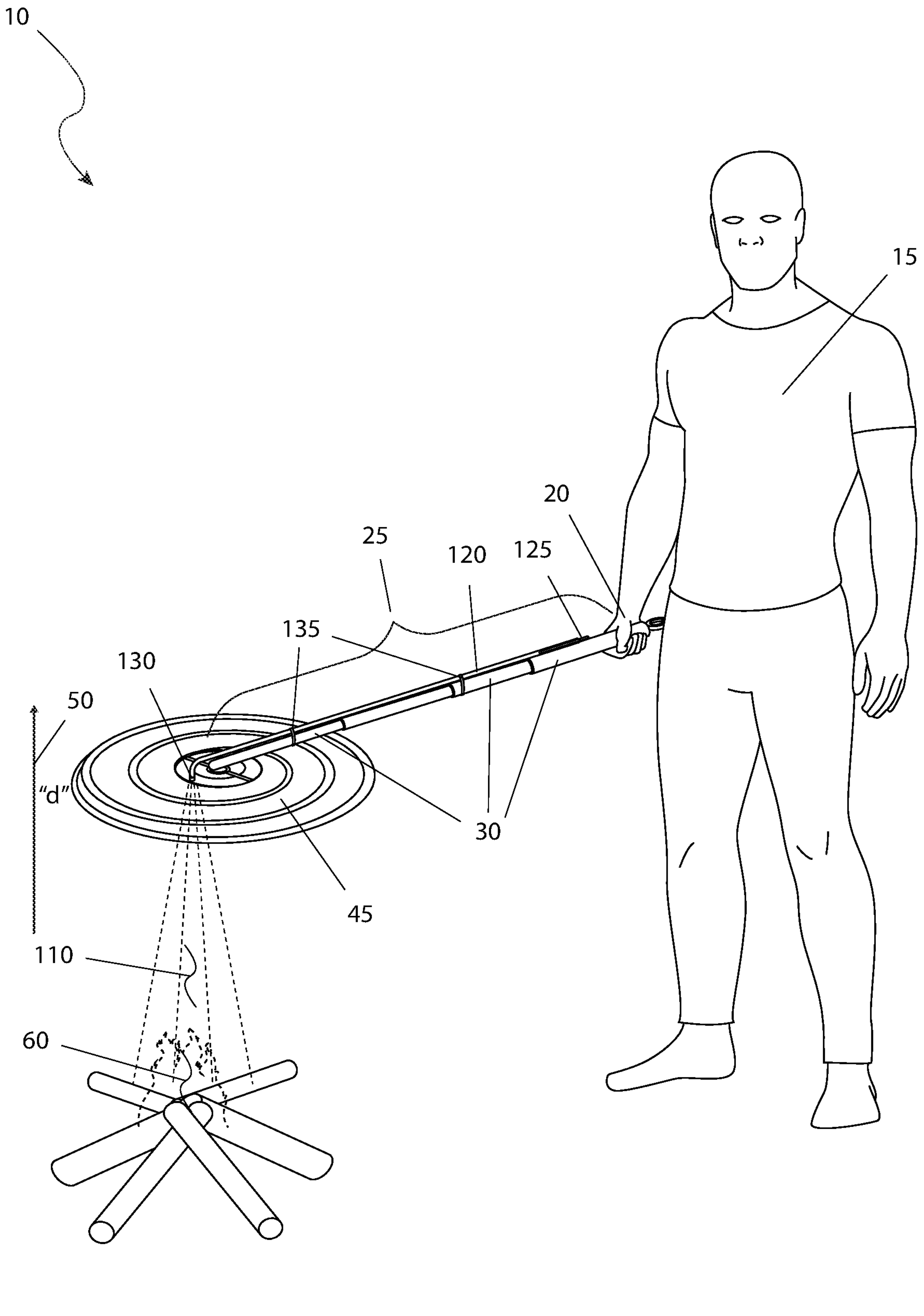

The best mode for carrying out the invention is presented in terms of its preferred embodiment, herein depicted within FIGS. 1 through 5 and alternately in FIG. 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
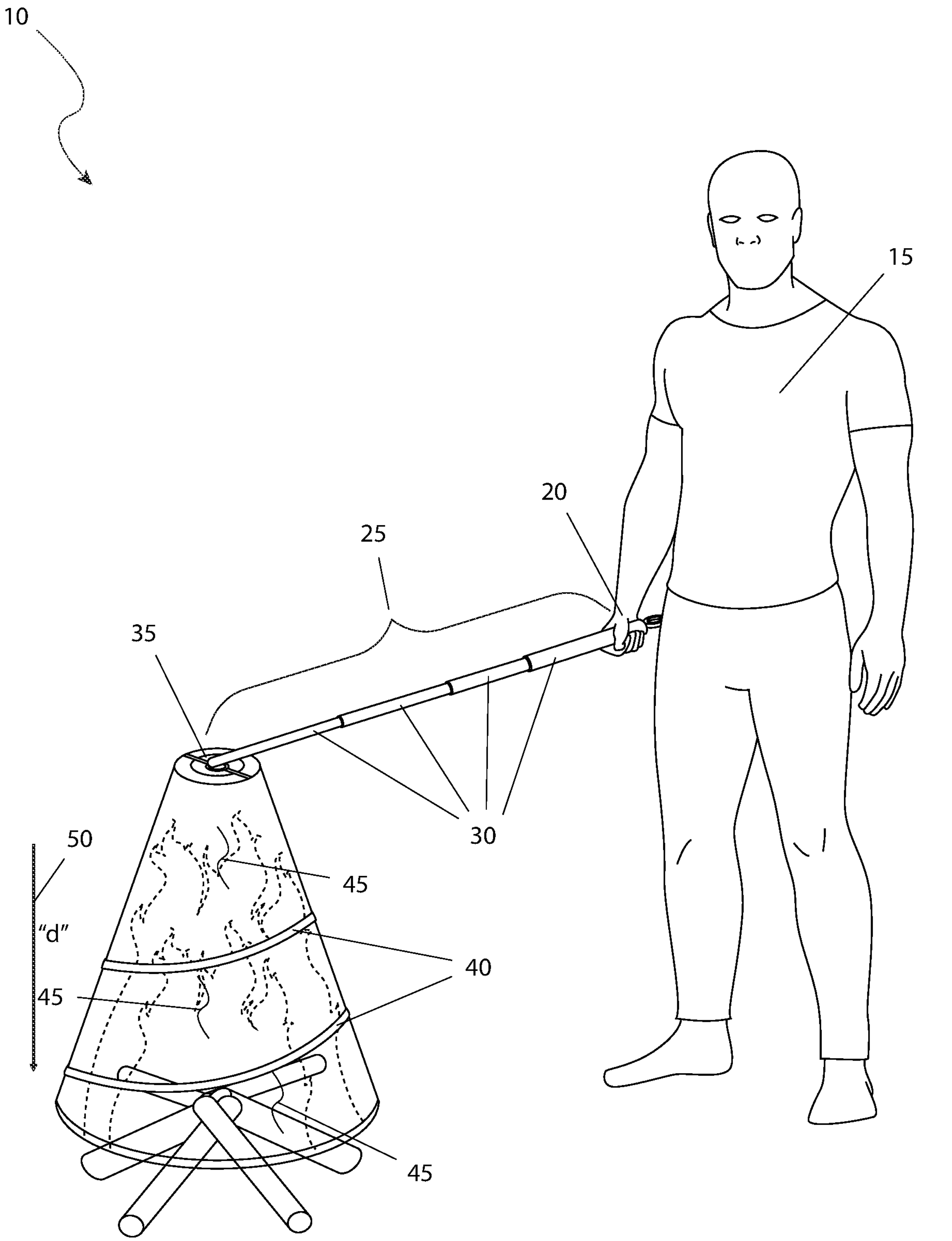
FIG. 1 is an environmental view of the deployable fire suppressive device 10, shown in a utilized state, according to the preferred embodiment of the present invention.

Referring now to FIG. 1, an environmental view of the deployable fire suppressive device 10, shown in a utilized state according to the preferred embodiment of the present invention is disclosed. The deployable fire suppressive device (herein also described as the "device") 10, provides for fire suffocation style particularly suited for extinguishing a fire 60, such as campfires or stove fires. A user 15 holds the device 10 in their hand 20 at the proximal end of an extended handle 25. The extended handle 25 comprises multiple sections of handle segments 30 which will be described in greater detail herein below. The distal end of the extended handle 25 is provided with a swivel joint 35 that is mechanical connection with a frame system 40. In turn the frame system 40 is provided with a fire-resistant fabric 45 that extends downward along a deployment travel path "d" 50. The interior of the fire-resistant fabric 45 may be coated with a fire suppressive substance 55 (not shown in this figure due to illustrative limitations), such as reactive agents to assist in the fire extinguishing process. As such, the device 10 may be used on Class A, B, or C fires 60. In FIG. 1, the fire 60 is depicted as a common campfire as may be experienced while camping in a backyard while using a fire pit or the like. However, the device 10 may be used on all types of fires 60, whether accidental fires, purposeful fires that now need to be extinguished, wildfires, or the like. As such, the use of the device 10 on any particular type of fire 60 is not intended to be a limiting factor of the present invention. In all cases, the device 10 assists in removing air, and more particularly oxygen, from the fire 60, allowing it to be extinguished.

Figure 2:
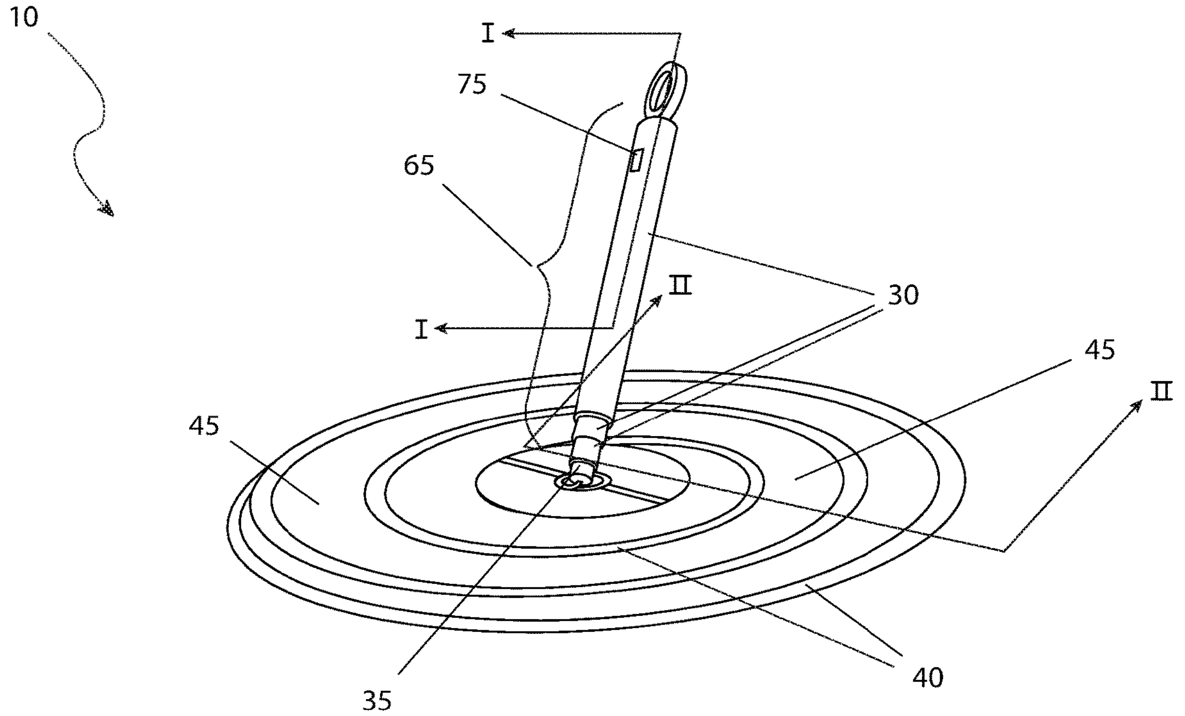
FIG. 2 is a perspective view of the deployable fire suppressive device 10, according to a first embodiment of the present invention.
Figure 3:
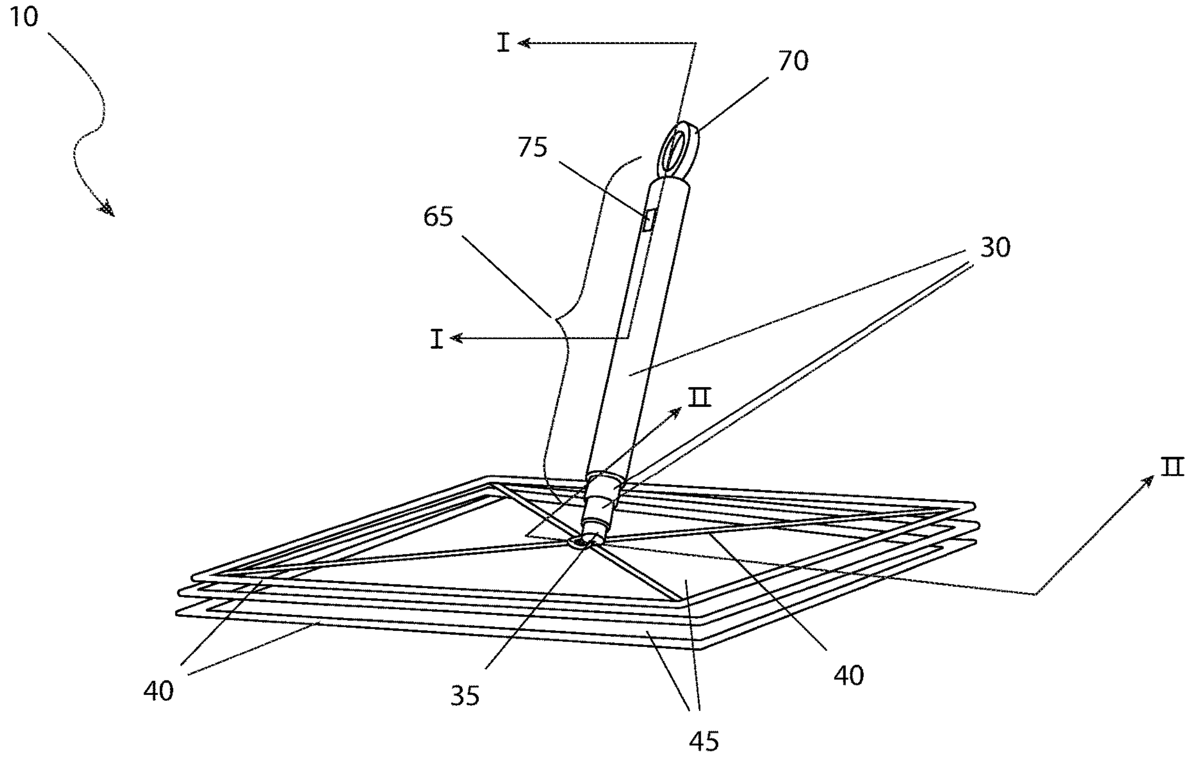
FIG. 3 is a perspective view of the deployable fire suppressive device 10, according to a second embodiment of the present invention.

Referring next to FIG. 2, a perspective view of the device 10, according to a first embodiment of the present invention is depicted. It is noted that the device 10 as depicted in FIG. 2 is in a collapsed state and is of a round circular design. This embodiment is envisioned as useful on a fire 60 (as shown in FIG. 1) that is round in nature such as a campfire, an uncontrolled fire, or the like. It is noted however, that the device 10 as shown in FIG. 3 may be used on any type or configuration of fire 60. The collapsed handle 65 is composed of multiple handle segments 30 but collapsed together in much the same manner as an umbrella handle. The collapsed handle 65 is provided with a hanging loop 70 to assist in storage of the device 10. Additionally, a release button 75 is provided for extension of the collapsed handle 65 as well as release of the frame system 40 and fabric 45. This view provides clarity of the frame system 40 and its spiral nature. Such a spiral configuration is similar to that of a "Slinky®" toy. In its collapsed state, as shown, the fabric 45 and the frame system 40 remain in a flat configuration, making the device 10 easy to store in a handy location where it may be easily accessible for readily extinguishing of a fire 60. The swivel joint 35 allows the collapsed handle 65 to fold flat against the frame system 40 and fabric 45 for purposes of storage within a small location. Referring now to FIG. 3, a perspective view of the device 10, according to a second embodiment of the present invention is shown. It is noted that the device 10 as depicted in FIG. 3 is in a collapsed state and is of a square design.

This embodiment is envisioned as useful on a fire 60 (as shown in FIG. 1) that is square in nature, such as stove top fires, grill, or the like. It is noted however, that the device 10 as shown in FIG. 3 may be used on any type or configuration of fire 60. As before, the collapsed handle 65 is composed of multiple handle segments 30 but collapsed together in much the same manner as an umbrella handle. The collapsed handle 65 is provided with a hanging loop 70 to assist in storage of the device 10. Additionally, a release button 75, similar to a gun trigger, is provided for extension of the collapsed handle 65 as well as release of the frame system 40 and fabric 45. This view provides clarity of the frame system 40 and its spiral nature. Such a spiral configuration is similar to that of a "Slinky®" toy, albeit in a square state. In its collapsed state, as shown, the fire-resistant fabric 45 and the frame system 40 remain in a flat configuration, making the device 10 easy to store in a handy location where it may be easily accessible for readily extinguishing of fire 60. The swivel joint 35 allows the collapsed handle 65 to fold flat against the frame system 40 and fabric 45 for purposes of storage within a small location.

Referring next to FIG. 4, a sectional view of the device 10, as seen along a line I-I, as shown in FIGS. 2 and 3, according to the preferred embodiment of the present invention is disclosed. The release button 75 is shown on the exterior-most handle segments 30 with the hanging loop 70 located on the far end. The release button 75 is mechanically connected to an actuating pin 80 provided with a return spring 85. Once pressed along an actuating travel path "a" 90, the multiple handle segments 30 extend outward due to the weight of the frame system 40 and fabric 45 (as shown in FIG. 1), with the collapsed handle 65 (as shown in FIGS. 2 and 3) in a top facing position. A release cable 95, such as a Bowden® cable, is attached to actuating mechanism 100, which in turn is in mechanical connection to the release button 75. As such, when the release button 75 is pressed, not only does the collapsed handle 65 (as shown in FIGS. 2 and 3) transform into the extended handle 25 (as shown in FIG. 1), but the frame system 40 (as shown in FIG. 1) is released as well. Further description of the release cable 95 will be provided herein below.

Referring to FIG. 5, a sectional view of the device 10, as seen along a line II-II, as shown in FIGS. 2 and 3, according to the preferred embodiment of the present invention is depicted. The release cable 95 extends down the multiple handle segments 30 as shown. This cable terminates at its distal end at a release mechanism 105. The release mechanism 105, comprising a lever-operated catch and a spring-loaded actuator within the frame system 40 and holds it in a collapsed or flat position as shown. When released, the release mechanism disengages, allowing the weight of the outward sections of the frame system 40 in combination with the fabric 45 (not shown in this figure due to illustrative limitations) will pull the fabric 45 downward, resulting in the conical configuration of FIG. 2, or the cubical configuration of FIG. 3. The release cable 95 may be routed through or around the swivel joint 35 and remains functional whether or not the handle segments 30 are provided in the extended handle 25 (as shown in FIG. 1) or in the collapsed handle 65 (as shown in FIG. 2).

Referring now to FIG. 6, it is shown that another embodiment of the invention would utilize a misting arrangement for assisting in dousing a fire 60 with water 110. A misting wand 120 comprises a diameter capable of being attached to and in fluid communication with a water source, such as garden hose. The misting wand 120 is capable of being integraly incorporated with, or removably attached to the handle 25 at various locations with at least one (1) strap 135. Such straps 135 may be fastened about both the misting wand 120 and handle 25 with a fastener such as a hook-and-loop type fastener to enable a snug fit due to the diameters of the handle 25 and misting wand 120. A first end of the misting wand 120 has in a gooseneck configuration that terminates in a nozzle 130 to enable a pressurized dispensing of the water 110. The first end of the misting wand 120 may by routed around or through either the frame system 40 or the fabric 45 so as to enable use of water 110 to douse the fire 60 when the frame system 40 and fabric 45 is deployed or not. A second end of the misting wand 120, intended to reside adjacent to the user's hand 20, has a plunger 125 to provide a pumping action to the water 110 within the misting wand 120.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5 and alternately in FIG. 6. The user would procure the device 10 from conventional procurement channels such as safety equipment stores, camping stores, hardware stores, home improvement stores, mechanical supply houses, mail order and internet supply houses and the like. Special attention would be paid to the type of shape configuration used, such as shown in FIG. 2 and FIG. 3. In any configuration the device is operable to extinguish fires by limited oxygen around the fire and by activating the mister to apply water.

After procurement and prior to utilization, the device 10 would be stored in its collapsed state, such as shown in FIG. 2 or 3 depending on the version utilized. The storage is envisioned to be compact, and not be readily apparent, but remain readily accessible in a manner of seconds. The storage is facilitated by the collapsing nature of the frame system 40 and fire-resistant fabric 45 along with the collapsing nature of the handle segments 30. At this point in time, the device 10 remains stored until needed for use.

During utilization of the device 10, should an unintended, accidental, or purposeful fire 60 required extinguishing, the device 10 would be retrieved from its storage location. The outermost handle segments 30 nearest the hanging loop 70 would be grasped in the hand 20 of the user 15. The user 15 would then press the release button 75 along the actuating travel path "a" 90, thus releasing the handle segments 30 as well as the frame system 40 through the release mechanism 105 via the release cable 95. The weight of the frame system 40 and fire-resistant fabric 45 will pull the frame system 40 downward and extend the fire-resistant fabric 45 while also extending the handle segments 30 into the extended handle 25, envisioned to be at least six feet (6 ft.) long. Next, the user 15 would place the frame system 40 and fire-resistant fabric 45 over the fire 60 until it is completely enclosed while the user 15 remains at a safe distance from the fire 60. This action is envisioned to extinguish the fire 60 in a manner of seconds due to the lack of oxygen. At this point in time, the device 10 may be safely removed from the location of the former fire 60.

If so equipped, the misting wand 120 may be attached to the handle 25 with at least one (1) strap 135 and connected to a water supply and filled with water 110 to a desired amount. When the frame system 40 and fabric 45 is deployed or not, the water 110 can be dispensed over the fire 60 with the plunger 125 being manipulated by the user 15.

After use of the device 10, it is allowed to cool and may be cleaned. The extended handle 25 is then manually retracted to the configuration of the collapsed handle 65. Likewise, the frame system 40 and fire-resistant fabric 45 are collapsed to a flat state, such as shown in FIGS. 2 and 3. The release mechanism 105 is then recoupled to the release mechanism 105. This process resets the device 10 allowing it to be stored again, for future potential reuse in a repeating and cyclical process.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as is suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical,* 520 US 17 (1997) or *Festo Corp. v. Shoketsu Kinzoku Kogyo Kabushiki Co.,* 535 U.S. 722 (2002), or other similar caselaw or subsequent precedent should not be made if any future claims are added or amended subsequent to this Patent Application.

What is claimed is:

1. A deployable fire suppressive device comprising:
an extendable handle with multiple segments;
a swivel joint at a distal end of said handle;
a frame system mechanically connected to the swivel joint;
a fire-resistant fabric attached to the frame system, wherein the fabric extends downward along a deployment travel path, wherein the handle is collapsible and includes a release button for extending the handle and releasing the frame system and fabric; and
a coating of a fire suppressive substance on the interior of the fire-resistant fabric; wherein the device is adaptable for use on Class A, B, or C fires.

2. The deployable fire suppressive device of claim 1, wherein the frame system has a spiral configuration allowing the fabric and frame system to remain flat in a collapsed state.

3. The deployable fire suppressive device of claim 2, wherein the spiral configuration of the frame system is adaptable to form a conical or cubical configuration when deployed.

4. The deployable fire suppressive device of claim 1, further comprising a misting wand removably attachable to the handle, the misting wand having a nozzle for dispensing water and a plunger for pumping the water.

5. The deployable fire suppressive device of claim 4, wherein the misting wand can be routed around or through the frame system or fabric for dousing a fire when the frame system and fabric are deployed.

6. The deployable fire suppressive device of claim 1, further comprising a release mechanism connected to the frame system, characterized by an actuating pin and a return spring for securing the frame system in a collapsed or flat position, and wherein releasing the mechanism, by disengaging the catch through the actuator's action, allows the weight of the frame system and fabric to pull the fabric downward into a deployed configuration.

7. A method for extinguishing a fire using a deployable fire suppressive device of claim 1, the method comprising:
extending the handle of the fire suppressive device comprising multiple segments;
deploying the frame system connected to the handle via a swivel joint;
unfolding the fire-resistant fabric attached to the frame system;
coating the interior of the fire-resistant fabric with a fire suppressive substance;
placing the deployed fire-resistant fabric over a fire to suffocate the fire by removing oxygen.

8. The method of claim 7, further comprising collapsing the handle and frame system after use, wherein the frame system and fabric collapse to a flat configuration.

9. The method of claim 7, wherein deploying the frame system and fabric includes pressing a release button on the handle, causing the frame system to unfold and the fabric to extend along a deployment travel path.

10. The method of claim 7, further including attaching a misting wand to the handle, the misting wand having a nozzle for dispensing water and a plunger for pumping the water, and using the misting wand to douse the fire with water.

11. The method of claim 8, further comprising routing the misting wand around or through the frame system or fabric for dispensing water whether the frame system and fabric are deployed or not.

12. The method of claim 7, further comprising resetting the device after use by manually retracting the extended handle and collapsing the frame system and fabric, and recoupling the release mechanism for future use.

13. A method for extinguishing a fire using a deployable fire suppressive device of claim 4, the method comprising:
extending the handle of the fire suppresive device comprising multiple segments;
deploying the frame system connected to the handle via a swivel joint;
unfolding the fire-resistant fabric attached to the frame system;
coating the interior of the fire-resistant fabric with a fire suppressive substance;
placing the deployed fire-resistant fabric over a fire to suffocate the fire by removing oxygen; and
dispensing water using a plunger for pumping the fire suppressive substance.

14. A deployable fire suppressive device comprising:
an extendable handle including a release button for extending the handle and releasing the frame system and fabric;
a swivel joint at a distal end of said handle;
a frame system mechanically connected to the swivel joint;
fire-resistant fabric attached to the frame system, wherein the fabric extends downward along a deployment travel path; and
a coating of a fire suppressive substance on the interior of the fire-resistant fabric;
wherein the device is adaptable for use on Class A, B, or C fires.

* * * * *